(12) United States Patent
Zheng et al.

(10) Patent No.: US 7,065,271 B2
(45) Date of Patent: Jun. 20, 2006

(54) OPTICAL GRATING COUPLER

(75) Inventors: Jun-Fei Zheng, Palo Alto, CA (US); Kazumi Wada, Lexington, MA (US); Jurgen Michel, Arlington, MA (US); Donghwan Ahn, Dorchester, MA (US); Lionel C. Kimerling, Concord, MA (US)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 10/280,159

(22) Filed: Oct. 25, 2002

(65) Prior Publication Data

US 2004/0081399 A1    Apr. 29, 2004

(51) Int. Cl.
*G02B 6/34* (2006.01)

(52) U.S. Cl. .......................................... 385/37; 385/12
(58) Field of Classification Search ................ 385/14, 385/15, 37; 359/34, 566
See application file for complete search history.

(56) References Cited

U.S. PATENT DOCUMENTS

| | | | | |
|---|---|---|---|---|
| 5,625,729 A | * | 4/1997 | Brown | ........................ 385/31 |
| 6,285,813 B1 | * | 9/2001 | Schultz et al. | ................ 385/37 |
| 6,490,393 B1 | * | 12/2002 | Zhou | ........................... 385/37 |

OTHER PUBLICATIONS

Suhara, Toshiaki, "Integrated Optics Components and Devices Using Periodic Structures" IEEE Journal of Quantum Electronics, vol. QE-22, No. 6, Jun. 1986, (2 pp.).

* cited by examiner

*Primary Examiner*—John R. Lee
*Assistant Examiner*—Phillip A Johnston
(74) *Attorney, Agent, or Firm*—Teddy Patty

(57) ABSTRACT

An optical grating is disposed on a waveguide to redirect light from the interior of the waveguide through the opposite side of the waveguide from the grating. In one embodiment the waveguide, the grating, and an optical sensor are combined in a single monolithic structure. In another embodiment, an absorbing layer is directly connected to the waveguide in the region of the grating. In still another embodiment, efficiency of the grating is improved by having a high index contrast between the refractive index of the grating and the refractive index of the cladding disposed over the grating, and by having an appropriately sized discontinuity in the grating.

7 Claims, 8 Drawing Sheets

OPTICAL GRATING COUPLER

BACKGROUND

1. Technical Field

An embodiment of the invention relates generally to optics, and in particular relates to optical grating couplers.

2. Description of the Related Art

Optical gratings are frequently used to redirect light in a waveguide into an optical detector external to the waveguide. Light that has been traveling transversely through the waveguide by reflecting off the waveguide's inner surface at shallow angles may be redirected so that it strikes the inner surface of the waveguide at a sharper angle that is greater than the critical angle of incidence, thus allowing the light to escape through the surface. After escaping, the light may impinge upon a detector. The detected light may then be used for various purposes, such as to receive an encoded communications signal that was transmitted through the waveguide. Unfortunately, this process may exhibit poor efficiency, with a large part of the redirected light not reaching the detector. Further, the cost of manufacturing the detector/optical coupler may be excessive due to the need to manufacture several items separately and then assemble them into a completed assembly.

BRIEF DESCRIPTION OF THE DRAWINGS

The invention may be understood by referring to the following description and accompanying drawings that are used to illustrate embodiments of the invention. In the drawings.

DETAILED DESCRIPTION

Figure 1:
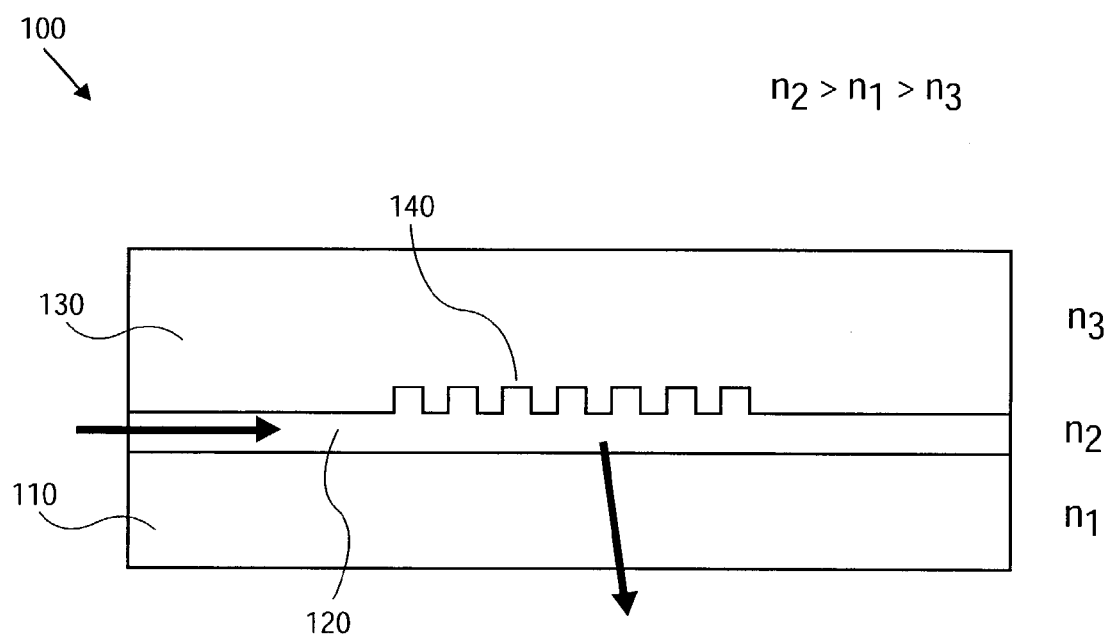
FIG. 1 shows a cross-section of a grating coupler, according to one embodiment of the invention.

In the following description, numerous specific details are set forth. However, it is understood that embodiments of the invention may be practiced without these specific details. In other instances, well-known structures and techniques have not been shown in detail in order not to obscure an understanding of the description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

Some figures show cross sections of various structures. The figures are not drawn to scale, and no inference should be drawn as to the relative dimensions of these structures based on the relative dimensions in the drawings.

This disclosure uses the following definitions, which may or may not be used in this manner outside this document:

Connected—denotes direct physical or electrical contact.

Coupled—denotes either direct or indirect physical or electrical contact, with "indirect" indicating that other elements may be between the coupled elements.

Optical coupler—a structure in which light is redirected from the interior of a waveguide to a light sensor/detector.

Waveguide—a solid device used to internally convey light by using internal reflections from the surfaces of the waveguide to keep all or most of the light from escaping, except in designated areas.

Grating—a structure of parallel ridge-like formations, along a portion of a surface of a waveguide, that redirect a portion of the light. The ridges may be referred to as 'teeth', while the space between the ridges may be referred to as 'gaps'.

Cladding—any optical medium, other than the waveguide and the grating, that is in intimate contact (i.e., direct physical contact) with the surface of the waveguide and/or the grating, and that has a different refractive index than the waveguide and/or the grating. Grating-side cladding is the cladding on the side of the waveguide that has a grating. Receptor cladding is the cladding on the opposite side of the waveguide from the grating, so named because a portion of the receptor cladding may receive some of the light redirected by the grating. The adjective "receptor" is used herein only to distinguish the indicated cladding from other cladding, and should not be interpreted as a limitation.

Optical medium—a medium through which light of a desired wavelength may travel. The waveguide, grating, and cladding referenced above may all be considered optical media.

Monolithic structure—a solid structure in which the elements are formed in intimate contact with the adjoining elements, rather than being assembled into a whole after forming the elements.

One embodiment of the invention has an optical coupler with a waveguide and a light sensor being part of a monolithic structure. Another embodiment integrates a light sensor directly onto the waveguide structure opposite the grating. Still another embodiment uses a high index contrast grating with a deliberate discontinuity in the grating structure to increase the efficiency of the grating, thus permitting the size of the grating to be greatly reduced without loss of coupling efficiency.

Inverted Grating Structure

FIG. 1 shows a cross-section of a grating coupler, according to one embodiment of the invention. Grating coupler 100 includes a waveguide 120 with a grating 140, a grating-side cladding 130, and a receptor cladding 110. In one embodiment grating coupler 100 redirects light from the waveguide to a detector. In the embodiment of FIG. 1, the horizontal arrow depicts light traveling from left to right through the waveguide 120. In one embodiment waveguide 120 receives the light from another transmission medium (e.g., a fiber optic cable), while another embodiment may have the waveguide as an integral portion of the transmission medium. Although some of the light may strike the inner surface of the waveguide 120 (e.g., the surface in contact with grating-side cladding 130 or the surface in contact with the receptor cladding 110), for most of this light the angle of incidence (the angle at which the light strikes the inner surface) will be less than the critical angle of incidence (the angle below which light is internally reflected rather than passing through the surface). The difference between the refractive index of the waveguide and the refractive index of the medium in contact with the waveguide surface determines this critical angle. Due to the shallow angle of incidence and the relative refractive indices of the waveguide 120 and grating-side cladding 130/receptor cladding 110, substantially all of the light may reflect back to the interior of the waveguide, thus maintaining high efficiency in the transmission of light. When the light reaches the area of the grating, however, the shape of the grating structure may cause a portion of the light to be redirected in substantially different directions. Some of this redirected light will strike the lower surface of the waveguide (i.e., the surface in contact with receptor cladding 110) at a high angle of incidence (i.e., above the critical angle) so that the light penetrates the surface and goes into receptor cladding 110. One embodiment uses air as the receptor cladding 110, but other embodiments may use other materials.

Unlike conventional grating couplers, which have the grating on the waveguide surface through which light is to be redirected (the "preferred direction" is to the grating side), embodiments of the invention may have the grating on the opposite side of the waveguide from that through which light is to be redirected (the "preferred direction" is away from the grating side). Also unlike conventional grating couplers, the cladding over the grating side has a lower refractive index than the cladding on the opposite side of the waveguide.

Each of the waveguide 120, grating-side cladding 130, and receptor cladding 110 have their own refractive index. In one embodiment, the refractive index n2 of waveguide 120 is higher than the refractive index n1 of receptor cladding 110, which is in turn higher than the refractive index n3 of grating-side cladding 130. The relatively high ratio of the refractive index n2 to refractive index n3 may cause virtually all light impinging on the n2–n3 interface to be reflected back into the waveguide and/or the grating structure. The somewhat lesser ratio of refractive index n2 to refractive index n1 may permit light striking the n2–n1 interface at a high angle to continue into receptor cladding 110, while light striking the n2–n1 interface at a relatively shallow angle may be reflected back internally, thus permitting the waveguide 120 to operate as a substantially lossless conveyor of light in the non-grating area, while effectively redirecting the light to an external medium in the grating area. The light entering receptor cladding 110 in this manner may be handled in various ways (e.g., the light may be captured and detected, the light may continue into another medium not shown, etc.).

The structures shown in FIG. 1 may have various dimensions, depending on the specific application. For example, in one embodiment, waveguide 120 may be between approximately 0.2 and approximately 2.0 microns (micrometers) in width and thickness, grating 140 may have a grating pitch (the center-to-center spacing of the grating teeth) of approximately 0.5 microns, the teeth of the grating may be approximately 0.2 microns in height, while the overall grating may be approximately 1.5 microns wide and up to a millimeter long along the length of the waveguide. Other embodiments may use other dimensions.

Figure 2:
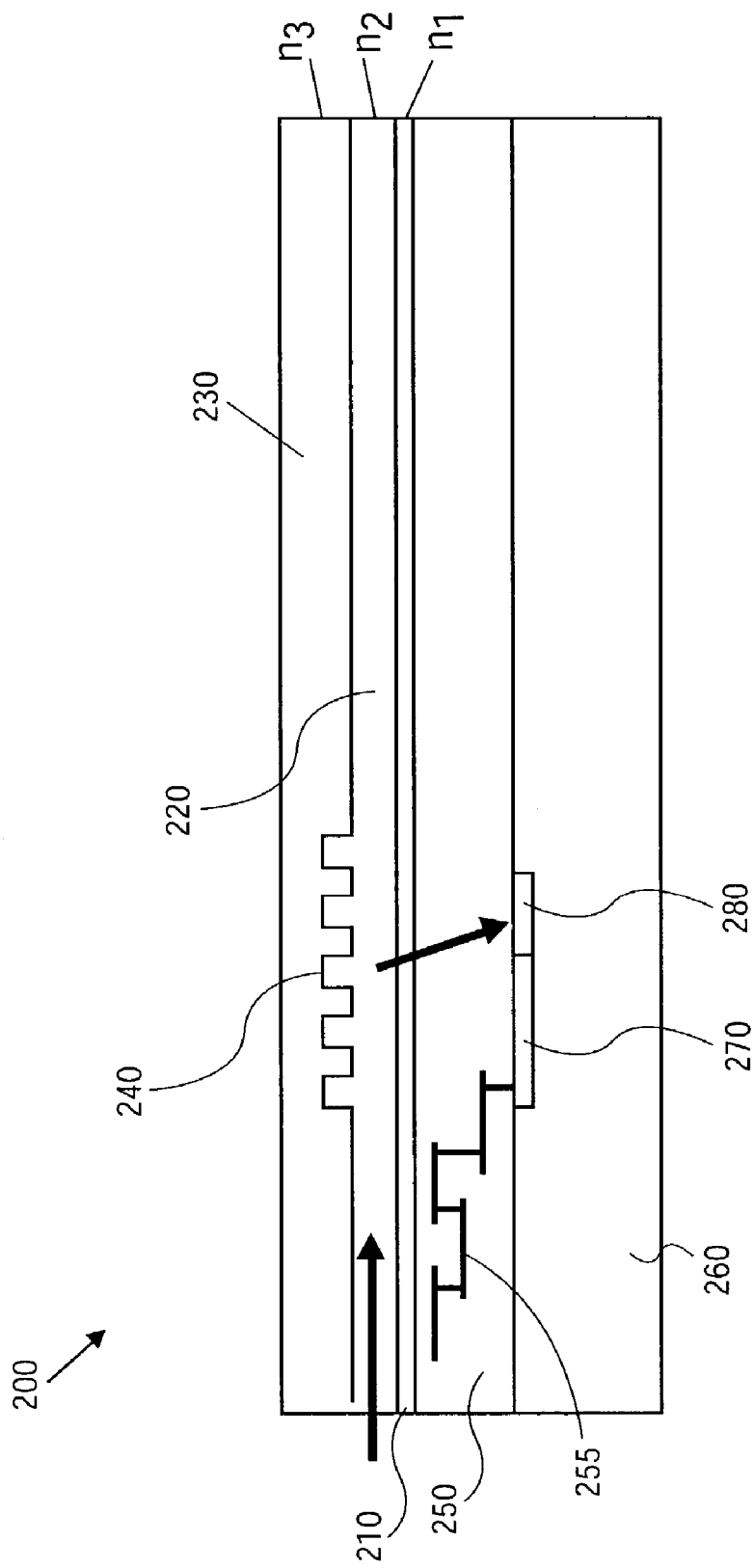
FIG. 2 shows a cross-section of a grating coupler, according to one embodiment of the invention.

FIG. 2 shows a cross-section of a grating coupler 200, according to one embodiment of the invention. The embodiment of FIG. 2 comprises a waveguide 220 with a grating 240, a receptor cladding 210, a grating-side cladding 230, an inter-layer dielectric (ILD) 250, a light sensor 280, an amplifier 270 to amplify the signal produced by the sensor 280, and a substrate 260. Items 210, 220, 230 and 240 may be similar to, and serve the same basic purposes as, items 110, 120, 130 and 140, respectively, in FIG. 1. In FIG. 2, substrate 260 is simply shown as a layer that provides a base for the remaining structure, but substrate 260 may serve other purposes as well, and may contain, or interface with, other components or layers not shown. In operation, the redirected light that exits waveguide 220 in the area of grating 246 may penetrate through receptor cladding 210, enter and penetrate through ILD 250, and strike light sensor 280. A signal from light sensor 280 may indicate the intensity of the received light. This signal may be amplified by amplifier 270 and sent to other circuitry where the signal may be processed in any desirable manner. In one embodiment a sensor comprises doped silicon in which photons of light create free electrons and holes in the atomic structure, while a voltage placed across the sensor causes a current to flow that is relatively proportional to the quantity of electrons and/or holes. The amplifier may then convert this current flow into a voltage level sufficient to drive other electronic circuits. Other embodiments may use other sensors and amplifiers to convert received light into an electrical signal. Light sensors and signal amplifiers are well known and are not further described herein.

A network of conductive traces and interconnecting vias 255, shown in cross-section within ILD 250, may be used to provide electrical power to amplifier 270 and sensor 280, and to receive signals from amplifier 270. The traces/vias 255 may provide the conductive connections between the amplifier 270 and other circuits not shown, as well as providing other conductive paths for other purposes. To prevent unnecessary loss of light, receptor cladding 210 and ILD 250 may be substantially transparent to the wavelengths of light used in grating coupler 200, and the area of ILD 250 that is above sensor 280 may be kept clear of traces and vias. Although a single grating, sensor, and amplifier are shown, the structure may include multiples of these devices.

As in FIG. 1, refractive indices n1, n2, and n3 represent the refractive indices of the receptor cladding, the waveguide, and the grating-side cladding, respectively. And like the embodiment of FIG. 1, the embodiment of FIG. 2 may have n2>n1>n3.

FIGS. 3A–3F show the fabrication of the grating coupler of FIG. 2, according to one embodiment of the invention. In the illustrated method, the following operations are used, but other methods of fabricating grating coupler 200 may also be used.

Figure 3A:
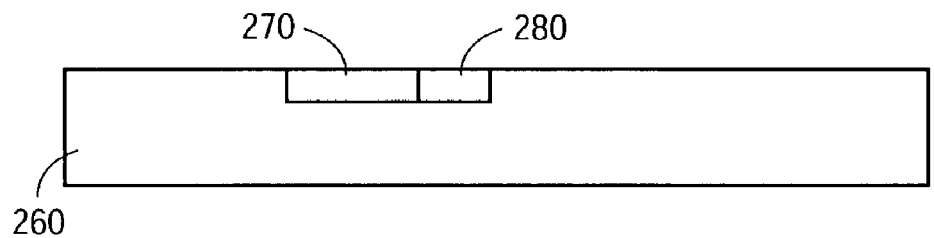
FIGS. 3A–3F show the fabrication of the grating coupler of FIG. 2, according to one embodiment of the invention.

In FIG. 3A, a substrate 260 is provided or created. In one embodiment substrate 260 is a wafer, such as the type of wafer on which integrated circuits are formed. In another embodiment, substrate 260 is a layer of material formed directly or indirectly on a wafer. Substrate 260 may be comprised of various materials, such as monocrystalline silicon.

As further shown in FIG. 3A, a light sensor 280 and an amplifier 270 are formed on the substrate 260. When operational, the combination of light sensor 280 and amplifier 270 may convert light received by the sensor into a voltage delivered by the amplifier, with the amount of the voltage having a pre-defined relationship to the amount of light received. In the illustrated embodiment the amplifier and sensor are side-by-side and disposed in a recess in the substrate, but other embodiments may have other configurations (e.g., they may be physically separated, one or both may be fabricated above the surface of the substrate, etc.). The formation of light sensors and their associated signal amplifiers is well known and is not described further.

Figure 3B:
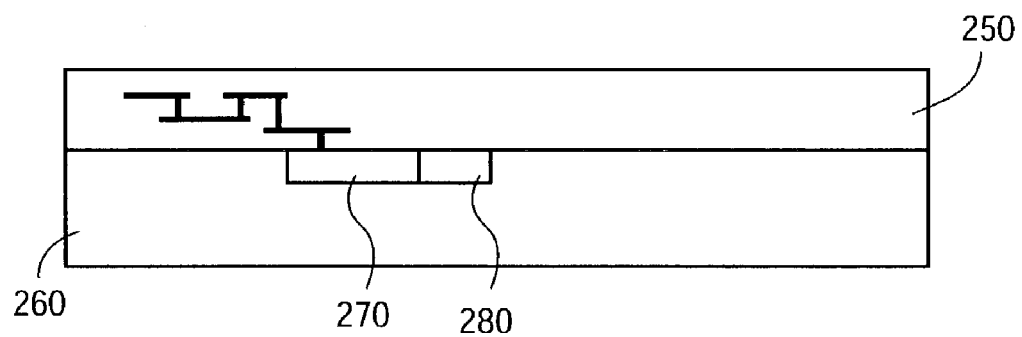

In FIG. 3B, an interlayer dielectric (ILD) 250 is formed above the substrate, amplifier, and sensor. In one embodiment, ILD 250 is comprised of silicon oxide, with embedded traces/vias comprised of conductive metal, but other embodiments may use other materials. In one embodiment a volume of the ILD that is directly above the sensor is left clear of traces and vias to provide a clear light path to the sensor 280. For simplicity, only a single electrically conductive path is shown terminating at the amplifier 270, but multiple such conductive paths may terminate at the amplifier 270 and/or sensor 280. Forming an ILD with conductive elements may involve several successive operations. The ILD 250 may have various thicknesses (e.g., less than 10 microns). Techniques for forming ILD's, including multiple levels of conductive elements, are well known and are not described further.

Figure 3C:
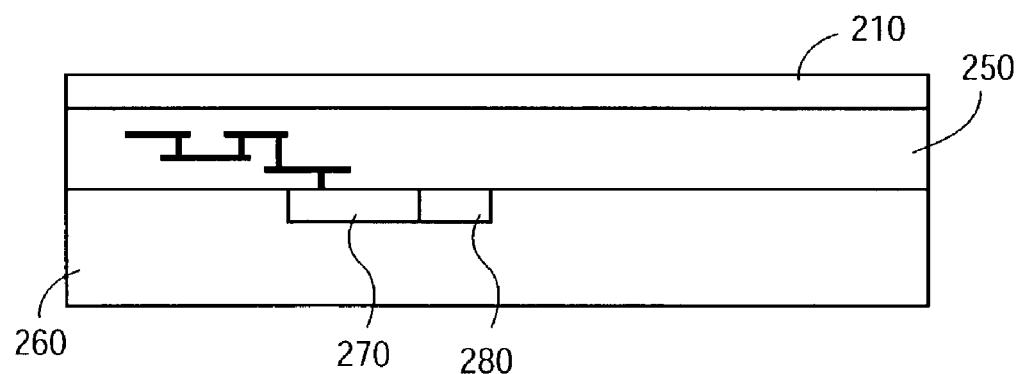

In FIG. 3C, receptor cladding 210 is deposited on the ILD. The material of receptor cladding 210 may be chosen for its refractive index relative to that of a waveguide created in a subsequent operation. In one embodiment receptor cladding 210 may comprise silicon oxynitride and may be between about 1.0 and about 2.0 microns thick, but other embodiments may use other materials and other thicknesses. The receptor cladding 210 may be deposited through various means (e.g., plasma chemical vapor deposition (PCVD), plasma enhanced chemical vapor deposition (PECVD), low pressure chemical vapor deposition (LPCVD), etc.).

Figure 3D:
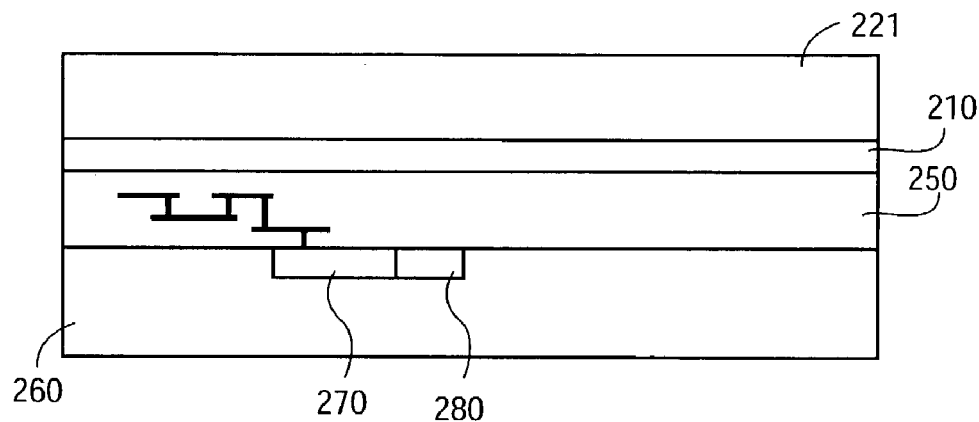

In FIG. 3D, waveguide material 221 is deposited on receptor cladding 210. In one embodiment waveguide material 221 is comprised of silicon nitride, but other embodiments may use other materials. Various techniques may be used to deposit the waveguide material 221 (e.g., PCVD, PECVD, LPCVD, etc.). The thickness of waveguide material 221 may have various values, but in embodiments in which the grating is to be etched into the waveguide material 221, the thickness must be greater than the height of ridges to be so etched, so that a viable thickness of waveguide will still exist beneath the grating.

Figure 3E:
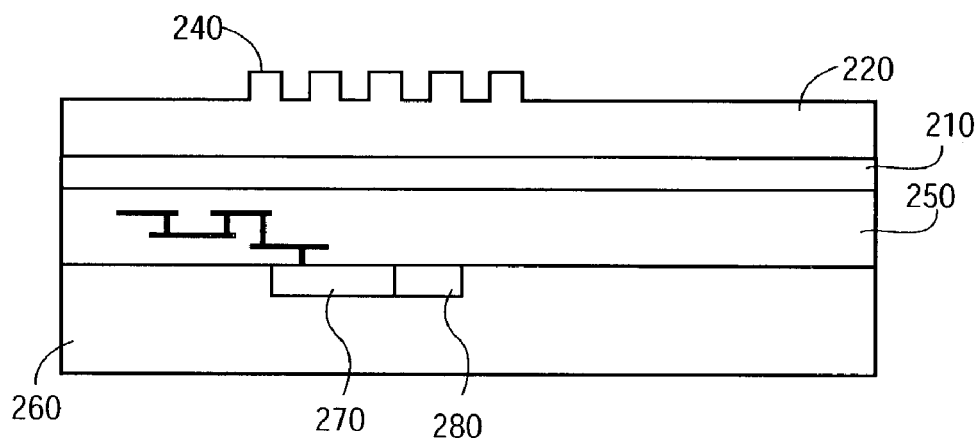

In FIG. 3E, a grating 240 is formed. In one embodiment, the grating 240 is formed by placing photoresist material on waveguide material 221, exposing and developing the photoresist to produce a pattern of photoresist, etching the portions of waveguide material 221 not covered by the pattern, and then removing all remaining photoresist material. In this process, all portions of the surface of the waveguide that are not to become grating teeth will be etched away to a certain depth, leaving the waveguide 220 and the raised grating 240 as a single monolithic formation. Other embodiments may use other techniques to form a grating (e.g., depositing a material onto the waveguide to form the grating from the deposited material). Although in some embodiments the waveguide and the grating are part of the same uniform material, with no structural or optical boundaries between them, they will continue to be referred to herein as separate items.

Figure 3F:
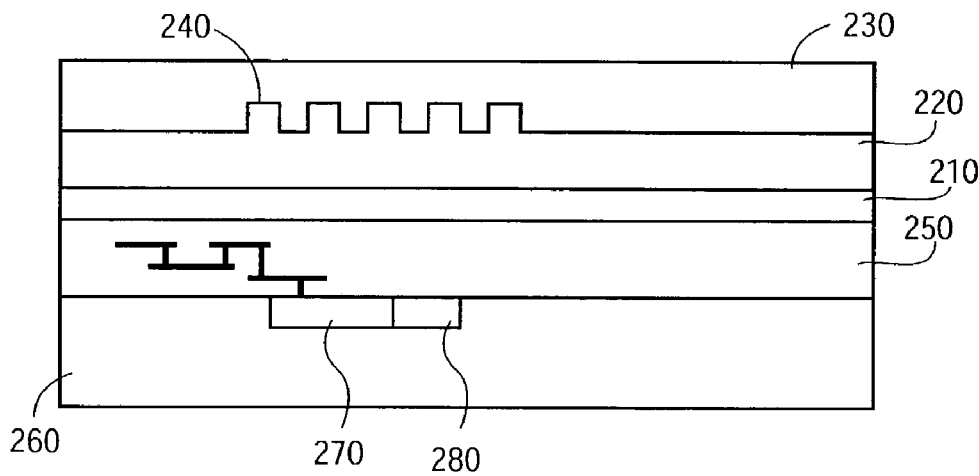

In FIG. 3F, grating-side cladding 230 may be deposited on the waveguide 220 and the grating 240. In one embodiment the grating-side cladding is comprised of silicon oxide, but other embodiments may use other materials. The grating-side cladding may be thick enough to cover all the grating, as well as the waveguide. The grating-side cladding may be deposited through various means (e.g., PCVD, PECVD, LPCVD, etc.).

Depending on the application, additional layers of material (not shown or described) may be formed above grating-side cladding 230 and/or below substrate 260.

In the foregoing manner, a complete grating coupler comprising the waveguide, the grating, refractive layers above and below the waveguide, the sensor and sensor electronics, and the interconnecting electrical paths, may be fabricated into a monolithic unit, using known or yet-to-be-developed processes common in the fabrication of integrated circuits. Further, the distance from the waveguide to the sensor may be as small as the combined thicknesses of the receptor cladding 210 and the ILD 250. In one embodiment, this combined thickness is less than approximately 12 microns, but other embodiments may use other thicknesses. This is in contrast with conventionally assembled optical couplers, in which the sensor may be approximately 100 microns from the waveguide. Since light loss increases with distance from the waveguide to the sensor, the close proximity of the sensor to the waveguide may cause less light loss and thus permit a smaller detector to be used.

In a particular embodiment, the waveguide is formed of silicon nitride with a refractive index of about 2.0, the grating-side cladding is formed of silicon oxide with a refractive index of about 1.5, and the receptor cladding is formed of silicon oxynitride with a refractive index between about 1.5 and about 2.0—the exact refractive index may depend on the ratio of oxygen to nitrogen in the silicon oxynitride. All three materials may be relatively non-absorbent to the wavelengths of light to be used in the grating coupler.

Grating-Enhanced Coupling into Photodetector

Figure 4:
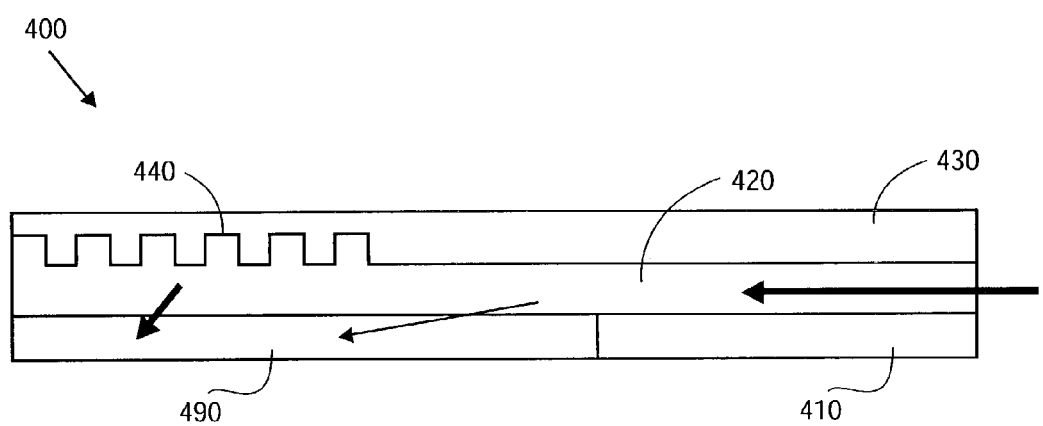
FIG. 4 shows a cross section of an integrated photodetector, according to one embodiment of the invention.

FIG. 4 shows a cross section of an integrated photodetector, according to one embodiment of the invention. In the illustrated embodiment of FIG. 4, photodetector 400 comprises a waveguide 420, grating 440, and absorbing layer 490. Absorbing layer 490 is a layer of material that absorbs, rather than being transparent to, light energy in the applicable wavelengths. As with sensor 280 of FIG. 2, in one embodiment absorbing layer 490 generates free electrons and/or holes in the atomic structure when light energy is absorbed, and placing a potential across the absorbing layer may cause current to flow in an amount related to the amount of light absorbed. In one embodiment absorbing layer 490 is comprised of germanium, but other embodiments may use other materials (e.g., silicon, silicon germanium, etc.). In one embodiment absorbing layer 490 is at least 30 microns thick, but other embodiments may have other thicknesses. In operation, light may travel through the waveguide (e.g., from right to left in FIG. 4 as indicated by the arrow), the light being substantially kept within the waveguide due to the shallow angle of incidence when light strikes the inner surface, and due to the material of cladding 410, 430, which are in intimate contact with waveguide 420, having a lower refractive index that the waveguide. When the internal light reaches the area of absorbing layer 490, however, the refractive index of the absorbing layer 490 is higher than that of the waveguide 420, which allows the exponentially decaying tail of the light outside the waveguide to be absorbed in the absorbing layer. This is sometimes referred to as evanescent wave coupling. Without more, however, the amount of light coupled into the absorbing layer 490 per unit of contact area (contact between the waveguide and the absorbing layer) through this mechanism may still be fairly low, requiring a relatively long strip of absorbing layer (e.g., a millimeter) to absorb enough light to create a reliable photodetector.

Grating 440 causes a portion of the light in the waveguide 420 to be redirected towards the absorbing layer 490 at steeper angles, so that a larger percentage of the light travels into the absorbing layer 490 in the region of the grating 440 than in the non-grating regions. Thus the absorbing layer 490 may be smaller than in a conventional photodetector because a greater percentage of light in the grating region is directed into the absorbing layer. In one embodiment the absorbing layer 490 is approximately 10 microns in length and width, but other embodiments may have absorbing layers with other dimensions. In a particular embodiment, the absorbing layer 490 is approximately the same in length and/or width as the grating 440.

High Index Contrast Grating With Discontinuity

Figure 5A:
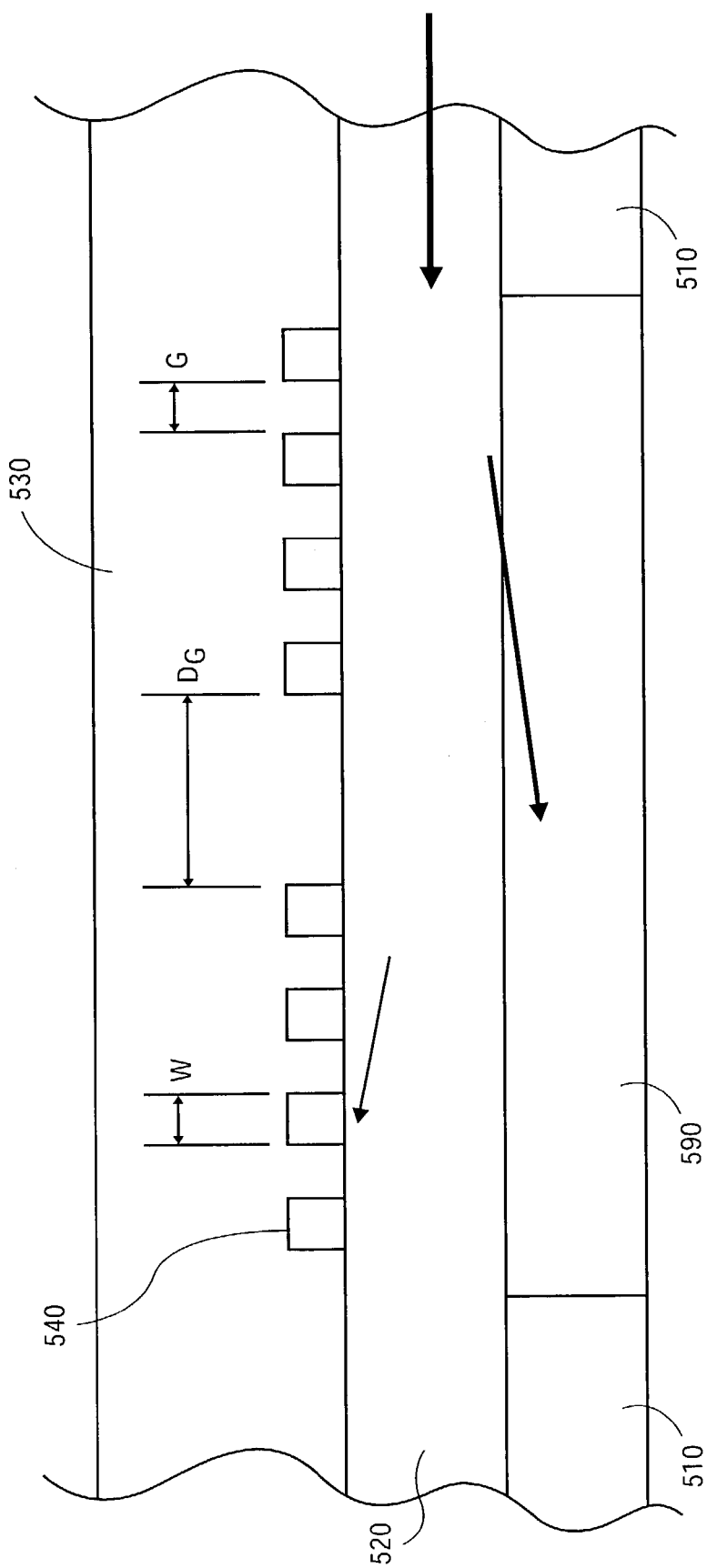
FIGS. 5A, 5B show a grating coupler with a discontinuity in the grating, according to one embodiment of the invention.

FIG. 5A shows a grating coupler with a discontinuity in the grating structure to improve efficiency, according to one embodiment of the invention. The illustrated structure includes waveguide 520, grating 540, and absorbing layer 590, as well as grating-side cladding 530, and cladding 510 on the opposite side of the waveguide in areas that are not covered by absorbing layer 590. Although the illustrated embodiment shows the absorbing layer 590 connected directly to the waveguide 520, other embodiments may differ (e.g., one or more intermediate layers may be disposed between the absorbing layer 590 and the waveguide 520). Unlike some of the couplers previously described, the refractive index of the material in the grating 540 is higher than the refractive index of the waveguide 520, and the refractive index of the waveguide 520 is higher than the refractive index of the grating-side cladding 530.

In FIG. 5A, W is the width of each tooth in the grating, G is the width of the gap between adjacent teeth, and $D_G$ is the width of the discontinuity. In some embodiments, G is approximately equal to the wavelength of the intended light divided by 4n, and $D_G$ is approximately equal to the wavelength of the intended light divided by 2n, where n is the refractive index of the material in the gap and in the discontinuity (e.g., the grating-side cladding). In a particular embodiment, the intended wavelength is approximately 850 nm, G is approximately 163 nm, DG is approximately 326 nm, W is approximately 105 nm, and n is approximately 1.3, but other embodiments may use other parameters.

Figure 5B:
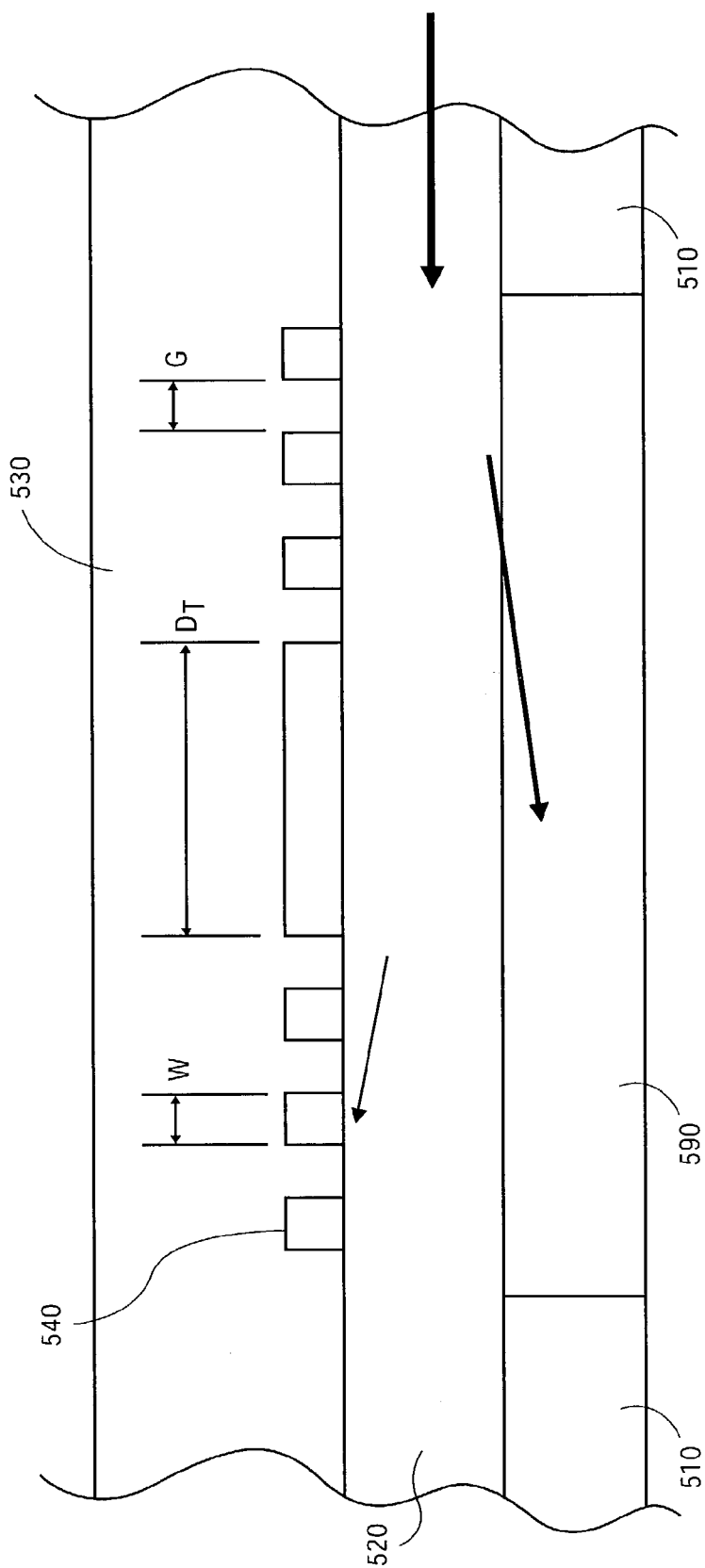

The embodiment of FIG. 5A shows a discontinuity in the form of a single extra-wide gap. FIG. 5B shows an alternate embodiment with a discontinuity in the form of a single extra-wide tooth. In one embodiment the extra-wide tooth has a width $D_T$ of approximately one wavelength of the intended light divided by n, or double the width $D_G$ of the gap discontinuity in FIG. 5A.

The efficiency of the grating, in terms of the amount of light redirected per unit of grating area, is improved as the ratio of the refractive indices of the materials in the teeth and in the gaps is increased. In one embodiment the material in the teeth comprises silicon nitride with a refractive index of approximately 2.0, and the material in the gaps comprises silicon oxide with a refractive index of approximately 1.5, for a ratio of 4/3. A parameter defined as the index contrast is equal to $(n_t - n_g)/n_t$, where $n_t$ is the refractive index of the material in the teeth, and $n_g$ is the refractive index of the material in the gaps. In the above example, the index contrast would be $(2.0-1.5)/2.0=1/4$.

In one embodiment, the efficiency provided by the discontinuity is sufficiently great that the grating has no more than ten teeth, far fewer than with conventional gratings, with a correspondingly small size. Other embodiments may use other quantities of teeth. In the illustrated embodiments, the quantity of teeth on either side of the discontinuity is the same, but other embodiments may have unequal quantities of teeth on either side of the discontinuity.

Figure 6:
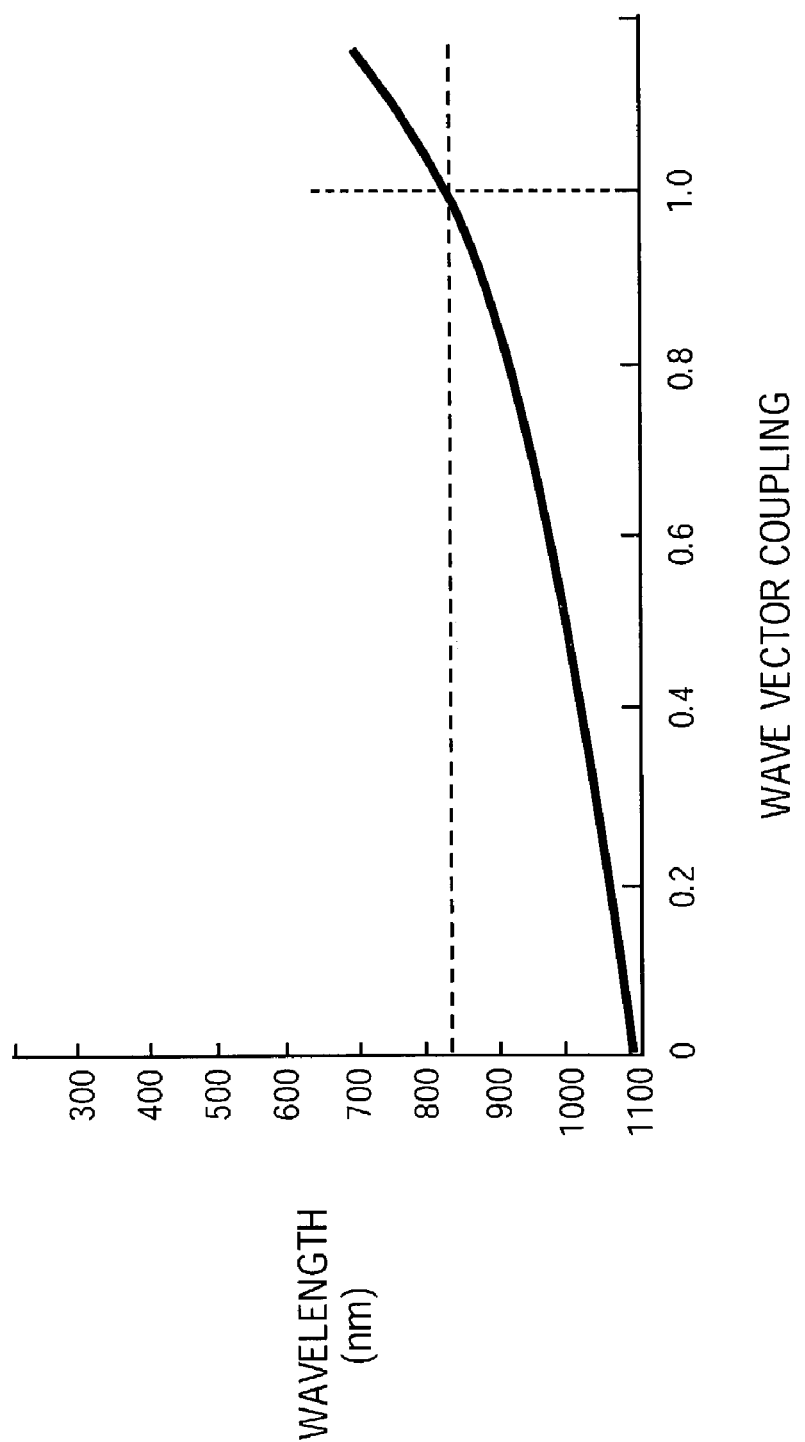
FIG. 6 shows a graph of optical coupling using a grating coupler with a discontinuity and a high index contrast, according to one embodiment of the invention.

FIG. 6 shows a graph of optical coupling using a grating coupler with a discontinuity and a high index contrast between the teeth and the adjacent cladding, according to one embodiment of the invention. In the illustrated embodiment, the vertical axis of the graph shows various wavelengths of light that might be redirected by the grating coupler of FIG. 5A. The horizontal axis shows the coupling, or redirection, of those wavelengths by the grating. As can be seen, light with a wavelength of 1100 nm or longer has a coupling of 0.0, corresponding to no redirection at all (i.e., the light is not redirected by the grating and continues to travel transversely through the waveguide). Light with a wavelength of 850 nm has a coupling of 1.0, corresponding to being redirected at an angle of 45 degrees to the nominal direction of travel through the waveguide, which should be sufficient to redirect the light out of the waveguide and into a sensor, absorbing layer, etc. as previously described. The effect of the grating/discontinuity on other wavelengths may be read from the graph. Thus the size of the discontinuity may be controlled to effectively redirect light of a particular wavelength or band of wavelengths.

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. An apparatus comprising:
   a monolithic optical coupler comprising
   an optical waveguide of a first optical medium, said optical waveguide having a first surface and a second surface on opposing sides of said optical waveguide, and an optical grating on a portion of said first surface;
   a second optical medium in intimate contact with said first surface and with said optical grating;
   a third optical medium in intimate contact with said second surface, wherein the refractive index of the third optical medium is less than the refractive index of the first optical medium, and the refractive index of the second optical medium is less than the refractive index of the third optical medium;
   an optical sensor integrated in said optical coupler to detect a light redirected into said third optical medium by said optical grating;
   an interlayer dielectric disposed between the optical sensor and the third optical medium.

2. The apparatus of claim 1, wherein the optical grating is to not redirect light within the optical waveguide into the second optical medium.

3. The apparatus of claim 1, further comprising: the interlayer dielectric comprises conductive elements to electrically couple the optical sensor to circuitry.

4. The apparatus of claim 1, wherein the interlayer dielectric and the third optical medium have a combined thickness of less than approximately 12 microns.

5. The apparatus of claim 1, wherein said optical waveguide comprises a first material and said optical grating comprises a second material; wherein said first material is different than said second material.

6. The apparatus of claim 1, wherein said second material comprises silicon nitride.

7. The apparatus of claim 1, wherein said optical sensor is disposed below said optical waveguide.

* * * * *